United States Patent [19]

Iwasaki et al.

[11] Patent Number: 5,773,167
[45] Date of Patent: Jun. 30, 1998

[54] AMORPHOUS CARBON ELECTRODE AND A SECONDARY BATTERY HAVING SUCH AN ELECTRODE

[75] Inventors: Naoki Iwasaki, Shiga-ken; Takeharu Inoue, Kyoto-fu; Isamu Sakuma, Shiga-ken; Naoki Shimoyama, Shiga-ken; Jun Tsukamoto, Shiga-ken; Keizo Ono, Ehime-ken, all of Japan

[73] Assignee: Toray Industries, Inc., Tokyo, Japan

[21] Appl. No.: 657,269

[22] Filed: Jun. 3, 1996

[30] Foreign Application Priority Data

| Jun. 1, 1995 | [JP] | Japan | 7-135124 |
| Jun. 27, 1995 | [JP] | Japan | 7-161134 |
| Dec. 28, 1995 | [JP] | Japan | 7-344125 |
| Dec. 28, 1995 | [JP] | Japan | 7-344126 |

[51] Int. Cl.$^6$ .................................................. H01M 4/58
[52] U.S. Cl. .......................................................... 429/218
[58] Field of Search ................................................ 428/218

[56] References Cited

U.S. PATENT DOCUMENTS

| 5,527,643 | 6/1996 | Sonobe et al. . |
| 5,587,255 | 12/1996 | Sonobe et al. . |
| 5,658,691 | 8/1997 | Suzuki et al. . |

FOREIGN PATENT DOCUMENTS

| 460617 | 12/1991 | European Pat. Off. . |
| 552731 | 7/1993 | European Pat. Off. . |
| 96303884 | 10/1996 | European Pat. Off. . |

*Primary Examiner*—John S. Maples
*Attorney, Agent, or Firm*—Morrison & Foerster LLP

[57] ABSTRACT

An amorphous carbon material, especially for an electrode of a lithium ion secondary battery, is characterized by an interlayer spacing d(002), obtained from the X-ray diffraction line assigned to the (002) plane of the carbon, of 0.345 nm to 0.365 nm, a ratio (Ps) os the number of carbon atoms involved in the layer structure to the total number of carbon atoms of from 0.54 to 0.85, and a ratio of the total nitrogen:total carbon atoms in the amorphous carbon of 0.005:1 to 0.055:1. The amorphous carbon material is prepared by applying a heat treatment to an amorphous carbon under under vacuum or inert gas atmosphere for at least 30 minutes to provide the desired crystalline structure. The carbon material may take the form of carbon fiber material, especially short carbon fibers obtained by pulverizing larger carbon fibers. A lithium ion secondary battery containing an electrode comprising such an amorphous carbon material has a large discharge capacity and high charge-discharge cycle characteristics.

11 Claims, No Drawings

AMORPHOUS CARBON ELECTRODE AND A SECONDARY BATTERY HAVING SUCH AN ELECTRODE

FIELD OF THE INVENTION

The present invention relates to an amorphous carbon material such as an amorphous fiber carbon material, to an electrode comprising such an material and to a secondary battery having such an electrode.

DESCRIPTION OF THE RELEVANT ART

In recent years, with popularization of such portable instruments as video cameras and notebook-type personal computers, the need for small-sized and high capacity secondary batteries has increased. However, in the nickel-cadmium battery at present in use, the battery voltage is about 1.2 V, which is very low and the energy density is hardly improved. Therefore, investigations into high energy secondary batteries have been performed using lithium metal which is the basest metal for the negative electrode.

However, in the secondary battery wherein lithium metal is used as an anode, there exist such problems arise such as release of lithium from the electrode accompanied by repeating of charge and discharge and danger of ignition caused by shortcircuit and, for that reason, it has not been commercialized yet. In addition, as metallic lithium is highly active, it is potentially dangerous.

In recent years, lithium ion batteries wherein various forms of carbon are used as active anode material have been developed as batteries which are safe and have high energy. A carbon material can be used as an anode active substance instead of metal lithium because the carbon is doped with lithium ion when charging is performed and it attains the same electric potential as that for metal lithium. In addition, at discharging, lithium ion is released from the anode and the anode returns to the original carbon. When carbon is used as an anode, it is safe because dendrite is not formed and metal lithium does not exist. It therefore exhibits excellent safety. This type of lithium ion secondary battery for portable instruments is rapidly growing in the marketplace.

Prior art documents showing this type of secondary battery are JP-A-208,079/1982, JP-A-93,176/1983, JP-A-192,266/1983, JP-A-90,863/1987 and JP-A-122,066/1987.

OBJECT OF THE INVENTION

However, because of the small amount of ion doped per unit weight in the carbon anode compared with the lithium metal anode, the charge-discharge capacity is small. In addition, there is irreversible capacity (charge capacity—discharge capacity) in the cathode at the early cycle and the irreversible capacity increases when amorphous carbon is utilized. In order to compensate for the irreversible capacity, it is required to provide a excess amount of the carbon anode material in the battery. To allow a large amount of doped ions to be included and to keep the irreversible capacity small, it is necessary to optimize the internal structure and surface structure of the carbon.

The present invention addresses the problem of providing an electrode with a large discharge capacity and high charge-discharge cycle characteristics, a secondary battery using it and a carbon material suitable for them.

SUMMARY OF THE INVENTION

According to the first aspect, the present invention provides an amorphous carbon material in which 1) the said carbon material has an interlayer spacing d(002) obtained from the X-ray diffraction line assigned to the (002) plane of the carbon, of 0.345 nm to 0.365 nm;

2) the ratio of the total nitrogen:total carbon atoms in the amorphous carbon is from 0.005:1 to to 0.055:1; and 3) the ratio (Ps) of the number of carbon atoms involved in the layer structure to the total number of carbon atoms is from 0.54 to 0.85.

A second aspect of the present invention provides an electrode for a battery, comprising the carbon defined above.

A third aspect of the present invention provides a secondary battery having such an electrode.

A fourth aspect of the present invention provides a method for preparing an amorphous carbon material wherein in the amorphous carbon material, 1) there is an interlayer spacing d(002) obtained from the X-ray diffraction line assigned to the (002) plane of the carbon, of 0.345 nm to 0.365 nm;

2) the ratio of the total nitrogen:total carbon atoms in the amorphous carbon is from 0.005:1 to to 0.055:1; and 3) the ratio (Ps) of the number of carbon atoms involved in the layer structure to the total number of carbon atoms is from 0.54:1 to 0.85:1; which method comprises applying a heat treatment to a carbon material under vacuum or an inert gas atmosphere for at least 30 minutes.

As the carbon material, a carbon fiber material is preferably used.

A fifth aspect of the present invention provides a method for preparation of a carbon fiber material as defined above wherein the heat treatment is carried out after milling carbon fiber material to provide short carbon fibers.

A sixth aspect of the present invention provides a method for preparing an amorphous carbon material wherein in the amorphous carbon material, 1) there is an interlayer spacing d(002), obtained from the X-ray diffraction line assigned to the (002) plane of the carbon, of 0.345 nm to 0.365 nm;

2) the ratio of the total nitrogen:total carbon atoms in the amorphous carbon is from 0.005:1 to to 0.055:1; and 3) the ratio (Ps) of the number of carbon atoms involved in the layer structure to the total number of carbon atoms is from 0.54:1 to 0.85:1; which method comprises applying a heat treatment to a copolymer of acrylonitrile with at least one of a vinyl aromatic and maleimide monomer.

Preferably, the heat treatment in accordance with the sixth aspect is carried out by heating in air at 150°–300° C., followed by heat treating in an inert gas at 900°–200° C. (more preferably for a period of from 1 to 10 minutes, especially for about five minutes).

The inert gas means a gas that does not react with the carbon at the heat treatment temperature, for example, nitrogen, argon or a mixed gas thereof.

Embodiments of the invention will now be described in more detail.

DETAILED DESCRIPTION OF THE INVENTION

In recent years, to improve carbon anode for lithium ion batteries, there have been two directions of research, those of attempting to provide an improved amorphous carbon and an improved crystalline carbon respectively. We have made extensive investigations and find surprisingly that an amorphous carbon with a specified structure is excellent as an anode material with high capacity and high charge-discharge cycle characteristics. We also find surprisingly that an amorphous carbon having a structure with a large interlayer spacing and containing some nitrogen atoms is excellent as an anode material.

We investigated the relation between carbon structure and anode performance and find that a carbon wherein the interlayer spacing d(002) was 0.345 nm to 0.365 nm, more preferably 0.353 nm to 0.365 nm and the ratio of the total nitrogen atom content to the total carbon atom content is 0.005 to 0.055 and the ratio (Ps) of the number 01 carbon atoms associated with the layer structure to the total number of carbon atoms was from 0.54 to 0.85 exhibits excellent anode characteristics.

In addition to that, we find that the carbon material of which the ratio of oxygen atom content to carbon atom content at surface is preferably 6% or less and the crystallite size (Lc) of the carbon is preferably 1.0 nm to 2.0 nm. Furthermore, a carbon material wherein the crystallite size (Lc) is 1.2 nm to 2.0 nm is preferably used.

The interlayer spacing d(002) in an amorphous carbon material of the present invention was obtained by subtracting the background from a corrected X-ray intensity wherein corrections to the influences of a polarization factor, an absorption factor and an atomic scattering factor obtained by equations 1, 2 and 3 were performed and fitting intensity of more than ½ of the peak strength with a secondary curve to obtain (002) reflective angle by the use of Bragg equation.

Polarization factor=$(1+\cos^2 2\theta' \cos^2 2\theta)/(1+\cos^2 2\theta')$  Formula 1

$\theta'$: Bragg angle of reflecting crystallite face of monochrometer

Absorption factor=$K[(1-1/\alpha)(1-e^{-2\mu\, \text{csc}\theta})+2t \cos \theta/A*e^{-\mu t}]$ Formula 2 wherein $K=AZ/2\mu; \alpha=2\mu\, A\csc 2\theta$

A: Width of X-ray irradiating the sample

Z: Height of X-ray irradiating the sample $\mu$: linear absorption coefficient of the sample $$\text{Atomic scattering factor} = \sum_{i=1}^{4} a_i\exp[-b_i\sin^2\theta/\lambda^2] + c \quad \text{Formula 3}$$

$$2d\sin\theta = n\lambda \quad \text{Formula 4}$$

The crystallite size (Lc) can be obtained from the width of (002) diffraction line by using the below described Scherrer's equation (Formula 5).

$$Lc(002)=K\lambda/\beta_o \cos \theta_B \quad \text{Formula 5}$$

wherein

Lc(002): the mean dimension in the vertical direction to the (002) plane of a carbon crystallite

K: 0.9

$\lambda$: the wave length of X-ray (0.154 nm in the case of CuK$\alpha$ line)

$\beta_o=(\beta_E^2-\beta_I^2)^{1/2}$ $\beta_E$: apparent value of half width (measured value)

$\beta_I$: corrected value $\theta_B$: Bragg angle.

The parameter Ps can be calculated using the corrected X-ray diffraction and a Patterson function; see MINORU SHIRAISHI and YUZOU SANADA, NIHON-KAGAKU KAISHI (1976), 154.

In general, the values of d and Lc of a carbon material are different from charged state to discharged state, but d and Lc in the present invention are the values for a discharged state. In addition, the values of d and Lc are a little different from carbon fibers before and after cutting into powdery carbon fiber and in the present invention, they are values obtained from X-ray diffraction spectra for powdery carbon fibers.

In the carbon material of the present invention, nitrogen atoms are incorporated. Crystallization (graphite formation) can be suppressed by incorporating nitrogens in the carbon structure and discharge capacity is improved by providing a specified carbon structure. The amount of nitrogen to the total amount of carbon is preferably 0.005:1 to 0.055:1 and more preferably, 0.020 to 0.040. The ratio of the total nitrogen:total carbon atom can be obtained by elemental analysis.

In addition, we find that irreversible capacity especially at the initial cycle can be decreased by using an amorphous carbon wherein the ratio of oxygen atoms to carbon atoms at the surface of the carbon is 6% or less, more preferably 3% or less and the ratio of nitrogen atoms to carbon atoms at the surface is 3% or less. As an index expressing the extent of decrease in the irreversible capacity at the initial cycle, there are not only the value of irreversible capacity itself but also charge-discharge efficiency (=discharge capacity/charge capacity) and it is quite natural that as an electrode active substance, it is preferable that the irreversible capacity is as small as possible and the charge-discharge efficiency is close to 1. The reason why the irreversible capacity decreases in the present invention is that side reaction during charging is suppressed by a decrease in the number of oxygen atoms or nitrogen atoms at the surface. Although there are several methods for decreasing oxygen atom content and nitrogen atom content, as one of the methods, a method wherein heat treatment is performed at an appropriate temperature is exemplified. It is thought that not only oxygen atoms and/or nitrogen atoms at the surface decrease but also change in the internal structure of carbon occurs and as a whole, the irreversible capacity decreases.

The ratio of oxygen atoms at the surface in the present invention can be obtained by means of X-ray photo-electron spectroscopy. More practically, a sample is irradiated, for example, with K$\alpha$-ray of magnesium as the X-ray source and the photoelectrons emitted from the surface of the sample are divided by their energy by means of an analyzer for detection. Binding energy of restricted electrons in a substance can be obtained as a spectrum and information related to constitutional elements at the surface can be obtained from the energy value of the atomic orbit.

As the carbon material of the present invention, there is no special restriction as to its source but heat-carbonized organic substances are used. Practically, a PAN-based carbon obtained from polyacrylonitrile (PAN), a pitch-based carbon obtained from a petroleum or a pitch, a cellulose-based carbon obtained from a cellulose and a vapor phase-grown carbon fiber obtained from a low molecular weight organic substance are exemplified and in addition, carbons obtained by heat treatment of polyvinyl alcohol, lignin, polyvinyl chloride, polyamide, polyimide, phenol resin and furfuryl alcohol may be used.

Methods for preparation of PAN-based carbons are well known; see for JP-B-4,405/1962, JP-B-21,175/1969, JP-B-24,185/1972, JP-B-6,244/1976. In these methods, a PAN-based carbon wherein the interlayer spacing d(002) obtained from the X-ray diffraction line assigned to the (002) plane among X-ray diffraction spectra is 0.345 nm to 0.365 nm can be obtained by heating a PAN-based polymer at 150°–300° C. in air and then heating it in an inert gas at 900°–2,000°

C. at the temperature reached for about 5 minutes. Indeed, we find that such methods can be employed to provide a PAN-based carbon wherein the interlayer spacing d(002) obtained from the X-ray diffraction line assigned to (002) plane among X-ray diffraction spectra is 0.345 nm to 0.365 nm.

However, when adopting the particular copolymers and/or conditions disclosed in these prior art documents, the resulting carbon material has too high a nitrogen content.

On the other hand, by appropriate choice of starting material and/or heat treatment conditions, as in methods employing the invention, an amorphous carbon material having the characteristics required by the invention is obtainable.

In the present invention, an amorphous carbon with the above described structure can be prepared from acrylonitrile copolymers, for example, copolymers with vinyl aromatic monomers such as styrene and/or maleimides are used as a raw material. Moreover, one particular monomer component of a PAN copolymer which is preferably present is itaconic acid.

As the comonomers to be copolymerized, styrene or styrene derivatives wherein hydrogen of a vinyl group or hydrogen of phenyl group are replaced or compounds wherein a heterocyclic or a polycyclic compound is bonded with the vinyl group instead of the phenyl group are preferable. More practically, alpha- or beta-methylstyrene, methoxystyrene, phenylstyrene or chlorostyrene, or o, m, p-methylstyrene, methoxystyrene, vinylstyrene, methylsilylstyrene, hydroxystyrene, chlorostyrene, cyanostyrene, nitrostyrene, aminostyrene, carboxystyrene or sulfoxystyrene, or vinyl-pyridine, thiophene, pyrrolidone, naphthalene, anthracene or biphenyl, can be exemplified as representative compounds. In addition, as examples in the case where maleimides are copolymerized, maleimide, or N-methyl-maleimide, ethylmaleimide, phenylmaleimide, benzylmaleimide, cyclohexylmaleimide, hydroxyethylmaleimide, chlorophenylmaleimide or vinylphenylmaleimide or N,N-phenyl-bismaleimide, are exemplified as the representative compounds and in addition, maleic acid or maleic anhydride, prepared by hydrolysis of these maleimides are examples of such maleimides.

For these styrenes and/or maleimides, there is no special restriction as to their method for polymerization and copolymerizing compositions in copolymerization with acrylonitrile.

When preparing a carbon material of the present invention, there are no special restrictions as to the practical means for incorporating nitrogen atoms at the desired concentration in the carbon material and for example, in a carbon material consisting of a nitrogen-containing polymer such as PAN and polyamide, nitrogen atoms included in the raw material before heat treatment can be incorporated in the structure of the carbon by selecting the heat treatment condition. In addition, in the carbon consisting of a petroleum pitch and other organic compounds containing no nitrogen atom in the starting raw material, a nitrogen containing carbon can be obtained by heat treatment after a nitrogen-containing functional group, for example, nitro group or amino group is introduced therein or after such a functional group is admixed.

Among them, a carbon material satisfying the desired characteristics is appropriately selected in accordance with the desired characteristics of an electrode and a battery wherein the carbon material is used. Among the above described carbon materials, when the carbon material is used for the anode of a secondary battery wherein a non-aqueous electrolyte containing an alkali metal salt is used, a PAN-based carbon, a pitch-based carbon and a vapor phase grown carbon are preferable. The PAN-based carbon is especially preferable because doping of lithium ions is excellent.

Examples of the morphological shapes which a carbon material of the present invention may take are powdery, fibrous or finely cut short fibers (milled fiber) are exemplified and there is no special restriction.

In the present invention, carbon fibers are preferably used as the carbon material and the milled fiber is more preferably used. As the milled fiber, a mean length preferably of 1 mm or shorter, more preferably 100 $\mu$m or shorter, still more preferably 50 $\mu$m or shorter and especially preferably 30 $\mu$m or shorter, is used. In addition, as the low limit, it is preferable that the ratio of the fiber length to the fiber diameter (aspect ratio) is at least 1. When the fiber length is 1 mm or longer, there are disadvantages, for example, in that when a sheet-like electrode is prepared by making a slurry, the coatability becomes worse and in addition, when an electrode is prepared, shortcircuit between cathode and anode easily occurs. When the aspect ratio is 1 or smaller, as the fiber cleaves in the fiber direction during the powdering process and active carbon faces are exposed, the cycle characteristics becomes worse.

The mean length of the fiber can be obtained by measuring the length in the fiber direction of at least 20 carbon fibers, for example, by microscopic observation by means of SEM. Various pulverizers can be used for cutting or grinding the carbon fiber to 1 mm or shorter.

The diameter of the carbon fiber used in the present invention preferably selected so as to fabricate the electrode shape easily and a carbon fiber with a diameter of 1–1,000 $\mu$m is preferably used and a diameter of 1–20 $\mu$m is more preferable. In addition, it is also preferable that several kinds of carbon fibers each with a different diameter are used.

As a method for obtaining the carbon of the present invention, it is preferable to heat-treat a carbon fiber. When a milled fiber is used, it is prepared by pulverizing a carbon fiber. The carbon of the present invention is prepared by performing the heat treatment of said milled fiber more preferably after pulverization even though the heat treatment may be performed before above described pulverization process. The method for the heat treatment is performed under vacuum or in an inert gas atmosphere such as argon gas and nitrogen gas. The heat-treatment temperature is preferably 700° C. to 1,600° C. and more preferably 1,000° C. to 1,400° C. When the heat-treatment temperature is lower than 700° C., the effect of the heat treatment is little and on the other hand, at a temperature exceeding 1,600° C., as crystallinity becomes high, the discharge capacity remarkably decreases. The heat-treatment time differs depending on the heat-treatment temperature and it is at least 30 minutes, preferably, 0.5 to 50 hours, more preferably, 1 to 8 hours, preferably after it reaches a specified heat treatment temperature. As the heat-treatment atmosphere, any atmosphere can be used as far as the carbon does not deteriorate during heat treatment but vacuum condition or/and an inert gas atmosphere such as nitrogen, argon, are preferably used.

Another electroconductive material such as a metal as a current collector for improving current collecting effect for an anode wherein a carbon of the present invention is used. There are no special restrictions as to the shape of this metal current collector and, for example, foil-like, fibrous and mesh-like can be used. When a foil-like metal current collector is used, a sheet-like electrode is prepared by coating a metal foil with a slurry. In the sheet-like electrode, to improve further the current collecting effect, an electro-conductive agent, preferably a electro-conductive carbon powder and a metal powder and more preferably an electro-conductive powder such as acetylene black and ketchen black are incorporated in an electrode consisting of said carbon fiber.

The electrode comprising the carbon material of the present invention can be used as an electrode of various batteries and there are no special restrictions as to the batteries in which it can be used, for example, in a primary battery or a secondary battery, but it is preferably used as an anode of a secondary battery. As especially preferable batteries, secondary batteries using a non-aqueous electrolyte containing an alkali metal salt such as lithium perchlorate, lithium borofluorate and lithium hexafluorophosphate can be exemplified.

As the active material for the cathode used as the secondary battery of the present invention, artificial or natural graphite powder, inorganic compounds such as metal oxides and organic polymer compounds may be used. In this case, when an inorganic compound such as a metal oxide is used as the cathode, charge-discharge reaction is generated by utilizing doping and dedoping of cations. When an organic polymer compound is used, charge-discharge reaction is generated by doping and dedoping of anions. There are various charge-discharge reaction modes associated with the substances such as these and they are properly selected in accordance with the positive characteristics of a desired battery. Practically, cathodes used in ordinary secondary batteries such as inorganic compounds, for example, transition metal oxides containing alkali metals and transition metal chalcogenides, conjugated polymers such as polyacetylene, polyparaphenylene, polyphenylenebinylene, polyaniline, polypyrrole and polythiophene, crosslinked polymers with disulfide bonds and thionyl chloride can be exemplified. Among them, in the case of a secondary battery wherein a non-aqueous electrolyte solution containing a lithium salt is used, transition metal oxides and transition metal chalcogenides of, for example, cobalt, manganese, nickel, molybdenum, vanadium, chromium, iron, copper and titanium, are preferably used.

As the electrolyte solution of the secondary battery wherein an electrode of the present invention is used, there are no special restrictions and conventional electrolyte solutions may be used; for example, and for example, acid or alkali water solutions or non-aqueous solvents are exemplified. Among them, as the electrolyte solution for the above described secondary battery consisting of a non-aqueous electrolyte solution containing an alkali metal salt, propylene carbonate, ethylene carbonate, γ-butyrolactone, N-methyl-pyrrolidone, acetonitrile, N,N-dimethylformamide, dimethyl sulfoxide, tetrahydrofuran, 1,3-dioxolane, methyl formate, sulfolane, oxazolidone, thionyl chloride, 1,2-dimethoxyethane, dimethyl carbonate, diethyl carbonate, ethyl methyl carbonate, their derivatives and their mixtures are preferably used.

As the electrolytes incorporated in the electrolyte solution, for example, alkali metal salts, especially lithium halide, perchlorate, thiocyanate, tetrafluoroborate, tetrafluorophosphate, tetrafluoroarsenate, aluminofluorate and trifluoromethane sulfonate are preferably used.

As the applications of secondary batteries wherein electrodes of the present invention are used, by utilizing their features of lightweight, high capacity and high energy density, they are widely useful in portable small-sized electronic instruments such as video cameras, personal computers, word processors, radio cassettes and portable telephones.

DESCRIPTION OF THE PREFERRED EMBODIMENTS

Preferred practical embodiments of the present invention will now be described with reference to the following examples.

Example 1

A carbon fiber ("Torayca T300" manufactured by Toray Industries Inc.) was pulverized into powder by using a pulverizer to obtain a milled fiber with a mean length of 30 μm. Then, said milled fiber was heat-treated under vacuum for 4 hours at 1,300° C. The interlayer spacing (d) and the crystallite size (Lc) obtained from the results of X-ray diffraction (the counter method) were respectively 0.352 nm and 1.7 nm. The ratio of the total nitrogen atom content to the total carbon atom content (N/C) in said carbon material was 0.022. In addition, the oxygen component and nitrogen content at the surface of the carbon were obtained by means of X-ray electron spectroscopy. In this case, as the X-ray source, Kα-ray of magnesium was used. The ratios of oxygen atoms and nitrogen atoms to carbon atoms at the surface of said carbon were respectively 3% and 1%. The ratio of the number of carbon atoms in the interlayer:total number of carbon atoms (hereinafter called the "Ps value") was 0.83.

Then, the above described milled fiber was used as an anode active substance and as an electro-conducting agent and a binder, acetylene black and polyvinylidene fluoride were respectively used. N-methylpyrrolidone was added into an anode mixture with the weight ratio of anode active substance:electro-conducting agent:binder of 80:5:15 to make them into a slurry and the slurry was applied onto a copper foil to prepare an anode. As the electrolyte solution, a mixed solution of propylene carbonate and dimethyl carbonate containing lithium hexafluorophosphate (concentration of 1 molar) was used and as a counter electrode and a reference electrode, a metal lithium foil was used and evaluation was performed by means of a three electrodes cell. The discharge capacity was determined as a capacity when charging was performed to 0 V(vs.Li+/Li) by a constant electric current of a current density of 307 mA/g per carbon weight and then, discharging was performed to 1.5 V(vs.Li+/Li) by a constant electric current of 61.5 mA/g. The discharge capacity of the carbon fiber electrode was 345 mAh/g and the irreversible capacity at the first charge-discharge was 99 mAh/g. The charge-discharge efficiency at this time was 0.78.

Example 2

A carbon fiber "Torayca T300" manufactured by Toray Industries Inc.) was pulverized into powder by using a pulverizer to obtain a milled fiber with a mean length of 30 μm. Then, the milled fiber was heat-treated under nitrogen for 4 hours at 1,200° C. The values of d and Lc obtained from the results of X-ray diffraction (the counter method) were respectively 0.352 nm and 1.8 nm and N/C was 0.025 in the carbon. In addition, the ratios of oxygen atoms and nitrogen atoms to carbon atoms at the surface of the carbon were respectively 3% and 1%. The Ps value was 0.84. The discharge capacity of the carbon fiber electrode was 330 mAh/g and the irreversible capacity at the first charge-discharge was 90 mAh/g. The charge-discharge efficiency at this time was 0.79.

Example 3

The electrode performances of a carbon fiber powder were evaluated using exactly the same method as that of Example 2 except that heat treatment of the carbon fiber powder was performed at 1,600° C. In addition, d=0.350 nm, Lc=2.3 nm and N/C=0.020. The ratios of oxygen atoms and nitrogen atoms to carbon atoms at the surface of the carbon were respectively 2% and 1%. The Ps value was 0.84. In this case, the discharge capacity was 200 mAh/g and the irreversible capacity at the first charge-discharge was 40 mAh/g. The charge-discharge efficiency at this time was high, namely 0.83, but decrease in discharge capacity was also observed.

Comparative Example 1

The electrode performances of a carbon fiber powder were evaluated using exactly the same method as that of Example 1 except that heat treatment of the carbon fiber powder was not performed. It was found that d=0.352 nm, Lc=1.5 nm and N/C=0.062. In addition, the ratios of oxygen atoms and nitrogen atoms to a carbon atoms at the surface of the carbon were respectively 12% and 3%. The Ps value was 0.81. In this case, the discharge capacity was 400 mAh/g and the irreversible capacity at the first charge-discharge was 220 mAh/g. The charge-discharge efficiency at this time was 0.66.

Example 4

A polymer consisting of 89.7 mole % acrylonitrile, 10 mole % styrene and 0.3 mole % itaconic acid was obtained as a dimethyl sulfoxide solution by reacting the monomers in dimethyl sulfoxide under nitrogen atmosphere by using azobisisobutyronitrile as a polymerization initiator at 65°–75° C. for 12 hours. The polymer was separated by performing reprecipitation of this polymer solution in water and a dried polymer was prepared by performing dry treatment of this at 90° C. for 5 hours. A powder with a mean particle diameter of 30 μm was obtained by pulverizing the obtained polymer by means of a ball mill and flameproof treatment of it was carried out in air at 180°–250° C. Successively, it was heated under nitrogen atmosphere for 5 minutes while the temperature was elevated up to 1,400° C. to prepare a carbon powder with a mean particle diameter of 10 μm. In the carbon, d=0.355 nm, Lc=1.5 nm, N/C=0.030. The ratios of oxygen atoms and nitrogen atoms to carbon atoms at the surface of the carbon were respectively 12% and 3%. The Ps value was 0.62. Evaluation of the electrode was performed by the same method as that of Example 1 except that as an electrolyte solution, ethylene carbonate containing lithium tetrafluoroborate with a concentration of 1 M was used. In this case, the discharge capacity was 400 mAh/g and the irreversible capacity at the first charge-discharge was 160 mAh/g. The charge-discharge efficiency at this time was 0.71.

Example 5

A polymer consisting of 94.7 mole % acrylonitrile, 5 mole % vinylnaphthalene and 0.3 mole % itaconic acid was obtained as a dimethyl sulfoxide solution by reacting the monomers in dimethyl sulfoxide under nitrogen atmosphere using azobisisobutyronitrile as a polymerization initiator at 65° C. for 12 hours. A carbon fiber was prepared by a method wherein an acrylic fiber with the degree of orientation of (400) of 86% obtained by a method wherein after wet spinning of the obtained polymerization solution was performed in a mixed solution of dimethyl sulfoxide/water=1:1, the obtained fiber was drawn into 10-fold, was made to be flameproof under non-stretched condition at 200°–250° C. and then, heated in nitrogen under non-stretched condition for 5 minutes while the temperature was elevated up to 1,100° C. This carbon fiber was ground by using a ball mill and an electrode was prepared by using the milled fiber. The evaluation was performed by the same method as that in Example 4 to obtain d(002)=0.351 nm, Lc=1.40 nm and N/C=0.045. The ratios of oxygen atoms and nitrogen atoms to carbon atoms at the surface of the carbon were respectively 14% and 3%. The Ps value was 0.70. The discharge capacity was 430 mAh/g and the irreversible capacity at the first charge-discharge was 170 mAh/g. The charge-discharge efficiency at this time was 0.72.

Example 6

A polymer consisting of 91.5 mole % acrylonitrile, 5 mole % styrene, 2 mole % N-phenylmaleimide and 1.5 mole % itaconic acid was obtained as a dimethyl sulfoxide solution by reacting the monomers in dimethyl sulfoxide under nitrogen atmosphere using azobisisobutyronitrile as a polymerization initiator at 64°–74° C. for 15 hours. A carbon fiber was prepared by a method wherein an acrylic fiber obtained by a method wherein after dry-wet spinning of the obtained polymerization solution was performed in a mixed solution of dimethyl sulfoxide/water=1:3, the obtained fiber was drawn into 5-fold, was made to be flameproof under stretched condition at 180°–250° C. and then, heated in nitrogen under stretched condition for 5 minutes while the temperature was elevated up to 1,300° C. Said carbon fiber was ground using a pulverizer to obtain a milled fiber with a mean length of 40 μm. It was obtained that d=0.355 nm, Lc=1.4 nm and N/C=0.046. The ratios of oxygen atoms and nitrogen atoms to carbon atoms at the surface of the carbon were respectively 13% and 3%. The Ps value was 0.72. An electrode was prepared by the same method as that in Example 1 using this milled fiber and the performances of the electrode were evaluated. The discharge capacity was 400 mAh/g and the irreversible capacity at the first charge-discharge was 160 mAh/g. The charge-discharge efficiency at this time was 0.71.

Example 7

The milled fiber described in Example 6 was heat-treated under vacuum at 1,000° C. for 3 hours. It was found that d=0.355 nm, Lc=1.4 nm and N/C=0.040. The ratios of oxygen atoms and nitrogen atoms to carbon atoms at the surface of the powdery carbon were respectively 2% and 2%. The Ps value was 0.76. An electrode was prepared by the same method as that in Example 1 using this milled fiber and the performances of the electrode were evaluated. At this time, the discharge capacity was 390 mAh/g and the irreversible capacity at the first charge-discharge was 130 mAh/g. The charge-discharge efficiency at this time was 0.75.

Example 8

The performances of an electrode of a carbon fiber powder was evaluated using exactly the same method as that in Example 7 except that the heat treatment of the carbon fiber powder was performed at 1,200° C. It was found that d=0.354 nm, Lc=1.6 nm and N/C=0.035. The ratios of oxygen atoms and nitrogen atoms to carbon atoms at the surface of the powdery carbon were respectively 3% and 1%. The Ps value was 0.77. At this time, the discharge capacity was 330 mAh/g and the irreversible capacity at the first charge-discharge was 75 mAh/g. The charge-discharge efficiency at this time was 0.81.

Example 9

Commercially available lithium carbonate ($Li_2CO_3$) and cobalt basic carbonate ($2CoCO_3 \cdot 3Co(OH)_2$) are weighed so as to obtain a molar ratio of Li/Co=1/1 and after the mixture had been mixed by means of a ball mill, it was heat-treated at 900° C. for 20 hours to obtain $LiCoO_2$. This was ground by means of a ball mill and a cathode slurry was prepared using acetylene black as an electro-conducting agent, polyvinylidene fluoride (PVdF) as a binder and N-methylpyrrolidone as a solvent and mixing them so as to provide a weight ratio $LiCoO_2$/acetylene black/PVdF=91/4/5 and a cathode was obtained by coating an aluminum foil with this slurry, drying the coated foil and pressing it.

An anode was prepared using a milled fiber prepared by a method wherein after a carbon fiber ("Torayca T300" manufactured by Toray Industries Inc.) was pulverized using a pulverizer, it was heat-treated under vacuum for 4 hours and by the same method as that in Example 1. It was found, on the carbon, that d=0.352 nm, Lc=1.8 nm and N/C=0.020 and the ratios of oxygen atoms and nitrogen atoms to carbon atoms at the surface were respectively 2% and 1%. The Ps value was 0.63. Said anode was laminated with the cathode prepared as described above through a separator of a porous polypropylene film ("Cellguard #2500" manufactured by Daicel Chemical Industries Co., Ltd.) to prepare an AA type secondary battery. Evaluation of charging of the secondary battery prepared above was performed using a mixed solution of propylene carbonate and dimethyl carbonate containing 1 mole lithium hexafluorophosphate as an electrolyte solution. Charging was performed to 4.3 V by a constant electric current of 400 mA and discharging was performed to 2.75 V at 80 mA. At this time, the discharge capacity of the secondary battery was 470 mAh and the discharge capacity per weight of the milled fiber used in this battery was 310 mAh/g and the irreversible capacity at the first charge-discharge was 80 mAh/g. At this time, the charge-discharge efficiency of the anode was 0.79.

Comparative Example 2

An AA type secondary battery was prepared using exactly the same conditions as those in Example 9 except that no heat treatment was applied on the milled fiber and its performances as a battery were evaluated. It was found, on the carbon, that d=0.352 nm, Lc=1.5 nm and N/C=0.062 and the ratios of oxygen atoms and nitrogen atoms to carbon atoms at the surface were respectively 12% and 3%. The Ps value was 0.81. The discharge capacity of the secondary battery was 440 mAh and the discharge capacity per weight of the milled fiber used in this battery was 300 mAh/g and the irreversible capacity at the first charge-discharge was 190 mAh/g. At this time, the charge-discharge efficiency of the anode was 0.61.

EFFECTS OF THE INVENTION

The present invention provides an amorphous carbon, especially for an electrode and a lithium ion secondary battery comprising the electrode has a large discharge capacity and high charge-discharge cycle characteristics.

We claim:

1. An electrode for a battery having a layer structure and comprising an amorphous carbon material in which:
   1) said carbon material has an interlayer spacing d(002) obtained from the x-ray diffraction line assigned to the (002) plane of the carbon, of 0.345 nm to 0.365 nm;
   2) the ratio of the total nitrogen:total carbon atoms in the amorphous carbon is from 0.005:1 to 0.55:1; and
   3) the ratio (Ps) of the number of carbon atoms involved in the layer structure to the total number of carbon atoms is from 0.54:1 to 0.85:1.

2. An electrode for a battery according to claim 1, wherein the interlayer spacing d(002) is 0.353 nm to 0.365 nm.

3. An electrode for a battery according to claim 1, wherein the number of oxygen atoms:number of carbon atoms at the surface of the said material is 0.06:1 or less.

4. An electrode for a battery according to claim 1, wherein said carbon material comprises crystallites of a crystallite size (Lc) obtained from the X-ray diffraction line assigned to the (002) plane of the carbon, of 1.0 nm to 2.0 nm.

5. An electrode for a battery according to claim 4, wherein the crystallite size (Lc) is 1.2 nm to 2.0 nm.

6. An electrode for a battery according to claim 1, wherein the ratio of the number of nitrogen atoms:number of carbon atoms at the surface of the carbon is 0.03 or less.

7. An electrode for a battery according to claim 1, which takes the form of carbon fiber material.

8. An electrode for a battery according to claim 7, wherein the carbon fiber material comprises carbon fibers having an average length<100 µm.

9. An electrode for a battery according to claim 1 prepared by heat treatment of a copolymer of acrylonitrile with a vinyl aromatic monomer and/or maleimides.

10. An electrode according to claim 1, which further comprises an electroconducting agent other than the amorphous carbon material.

11. A secondary battery comprising an electrode according to claim 1.

* * * * *